United States Patent Office
3,244,564
Patented Apr. 5, 1966

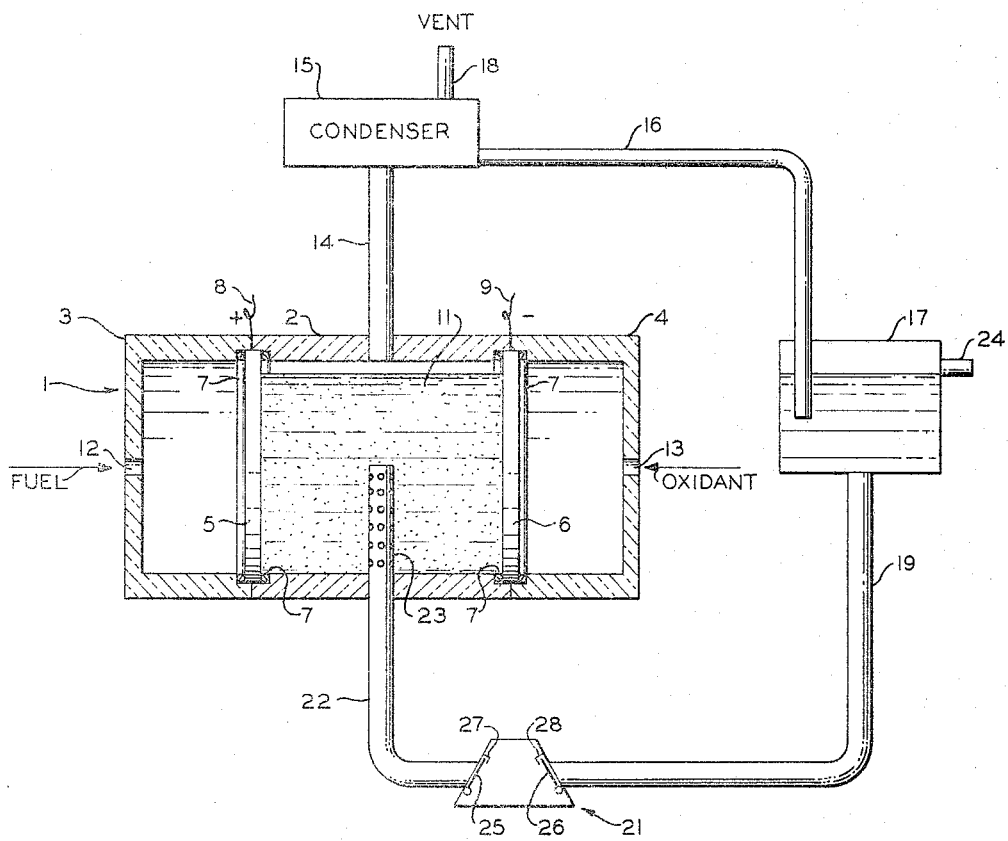

3,244,564
FUEL CELL
Homer M. Fox, Bartlesville, Okla., assignor to Phillips Petroleum Company, a corporation of Delaware
Filed Dec. 4, 1961, Ser. No. 156,592
1 Claim. (Cl. 136—86)

This invention relates to fuel cells. In one aspect this invention relates to a method and apparatus for operating fuel cells under elevated temperature conditions. In another aspect this invention relates to a new and improved fuel cell containing a gelled electrolyte.

A fuel cell is in essence a pair of electrodes in contact with an electrolyte contained in a suitable structure, with provisions for introducing a fuel to one electrode and an oxidant to the other electrode. Suitable fuels include hydrogen, natural gas, propane, butane, kerosene, methyl alcohol, ethyl alcohol, and the like. Suitable oxidants are oxygen and air. Electrolytes such as aqueous sulfuric acid, aqueous potassium hydroxide and the like have been used. Electrodes are commonly made of carbon, preferably impregnated with a metal catalyst such as platinum, palladium, silver, and the like which are relatively inactive chemically under the conditions of use.

Liquid electrolytes are commonly employed in fuel cells and these liquids are readily handled in the preparation of the fuel cells for use. However in the actual use of the fuel cells liquid electrolyte tend to splash about when subjected to movement such as employment in moving vehicles, and the liquid electrolytes tend to leak from cell casing joints even when the fuel cells are stationary. Electrodes, especially gas-diffusion electrodes, often have small pores of carefully controlled sizes, the purpose being to increase current density by increasing the interface gas-electrode-electrolyte. When utilizing liquid electrolyte, the pores often fill with electrolyte or with water produced in the fuel cell reaction. This flooding of the electrodes causes unstable operation.

In the operation of fuel cells at elevated temperatures, such as 250° F., the water which is a byproduct of the reaction in the fuel cell is driven off in the form of water vapor. Also the aqueous electrolyte tends to become concentrated at high temperatures due to evaporation of water from the electrolyte.

It has been discovered that these difficulties are substantially reduced, if not eliminated, through the utilization of a gelled electrolyte and/or means for maintaining the water content of the electrolyte substantially constant. In accordance with the invention a gelled electrolyte for a fuel cell is formed by incorporating a minor amount of a finely divided, substantially non-conductive solid gelation agent in a normally liquid electrolyte. Further in accordance with the invention there is provided a fuel cell having a gelled electrolyte and means for recovering the water vapor emitted from the cell under high temperature conditions, means for condensing the recovered water vapor, and means for returning condensed water vapor to the fuel cell in such a manner as to maintain the water content of electrolyte substantially constant.

Accordingly, it is an object of the invention to reduce electrolyte sloshing and spillage in fuel cell applications. It is another object of the invention to stabilize operation of a fuel cell under high temperature conditions. Another object of the invention is to prevent flooding of fuel cell electrodes. Yet another object of the invention is to permit operation of fuel cells at high temperatures. A still further object of the invention is to reduce or eliminate the leakage of electrolytes from fuel cells.

Other aspects, objects, and advantages of the invention will be apparent from a study of the disclosure, the drawing, and the appended claim.

In the drawing there is shown a schematic of a fuel cell system in accordance with the invention.

Referring now to the drawing there is shown a fuel cell 1 having a cylindrical casing comprising a cylindrical body portion 2 and cylindrical end pieces 3 and 4. The housing can be made out of any suitable material, such as Lucite. Electrodes 5 and 6 are positioned between body portion 2 and the respective end pieces 3 and 4 by means of O-rings 7. Output terminals 8 and 9 are connected to electrodes 5 and 6, respectively, by suitable means, such as gold foil. The space between electrodes 5 and 6 is substantially filled with a gelled electrolyte 11. As shown in the drawing electrodes 5 and 6 constitute the anode and cathode, respectively, of a fuel cell. Suitable fuel is fed to the anode electrode 5 through opening 12 in end piece 3 while a suitable oxidant is fed to cathode electrode 6 through opening 13 in end piece 4.

The operation of a fuel cell under elevated temperature conditions results in the evaporation of water, both from the electrolyte and the water byproduct of the reaction of the fuel and oxidant. The water vapor is removed from the fuel cell through line 14 and passed to a condenser 15, which can be a suitable condenser such as an air condenser. Water vapor is condensed in condenser 15, and the condensed water is passed through line 16 to a reservoir 17. Non-condensible byproducts which reach condenser 15 are vented through a line 18. Reservoir 17 is provided with a line 19 to return water to fuel cell 1 through flow control valve 21, line 22 and perforated pipe 23. Reservoir 17 is provided with an overflow line 24 positioned at the same level as the desired level of the electrolyte in the fuel cell 1. Flow control valve 21 comprises two flapper valves 25 and 26 having respective stops 27 and 28.

Thus, under routine operating conditions the water vapor is removed from fuel cell 1, passed to condenser 15 wherein it is condensed, and the condensed water is then passed to reservoir 17. The water level in reservoir 17 is maintained at the desired level through the use of overflow pipe 24. As the electrolyte is heavier than water, there is normally a slight differential in liquid level when the hydraulic heads in the two sides are equal. As the water content of the electrolyte of fuel cell 1 is reduced, the differential head between the water level of reservoir 17 and the level of the electrolyte of the fuel cell increases, resulting in the introduction of water from reservoir 17 into the electrolyte in the fuel cell through perforated pipe 23. Flapper valves 25 and 26 are tilted towards each other at a slight angle so that they are open under level conditions, but one or the other will automatically close when the fuel cell is tilted at an angle. Thus if the left side of fuel cell 1 is tilted downwardly beyond a predetermined amount flapper 25 will close, thus preventing an over supply of water to the electrolyte; while if the right side of the fuel cell is tilted downwardly beyond a predetermined amount, flapper valve 28 automatically closes, thus preventing the withdrawal of material from the fuel cell through lines 23 and 22.

The electrolyte of the invention, being a gel, is not subject to the disadvantages of sloshing, spillage, leakage, and flooding, as previously discussed. As the gelled electrolyte is essentially non-mobile under ordinary forces it does not splash or leak out of the fuel cell, and electrolyte flooding is not encountered so that stable cell operation is possible without elaborate precautions to prevent flooding.

The electrolyte 11 is composed of a conventional liquid electrolyte to which a sufficient amount of finely divided, substantially non-conductive solid gelation agent or thickening agent has been added to reduce the mobility of the electrolyte to produce the desired stability under conditions which it is to be utilized. Generally, this is achieved by the introduction of 1 to 10 or more weight percent of the finely divided solid to the liquid electrolyte.

Solid gelation or thickening agents suitable for use in this invention are oxides such as oxides of aluminum, titanium, zirconium and silicon. The material should be of low density and high void space. High surface area is not a requirement, but does not in itself cause the material to be unsuitable. A fibrous or similar structure causing bridging of the particles in the liquid electrolyte so that a relatively small actual volume occupies a large apparent volume is desirable. The solid oxides suitable for use in this invention are thus best characterized by the ratio of the true density of the oxide to the apparent density of a lightly settled bed of finely divided solid or by the void space in a lightly settled bed of solid. The void space in a settled bed of oxide is in the range of about 75 to about 99.5 volume percent, preferably about 90 to about 99 volume percent.

Although numerous oxides are suitable within the scope of the present invention, oxides having an average discrete particle size of not over 100 millimicrons preferably less than 50 millimicrons, and produced by vapor phase hydrolysis or oxidation of compounds of the corresponding metal and/or metalloids are preferred. Such vapor phase reactions are generally carried out at temperatures of about 1000° F. or higher. For example, halides or other vaporizable compounds of one or more of the group consisting of aluminum, titanium, zirconium and silicon can be mixed with high temperature steam or carried to a combustion zone in which excess oxygen is present or in which high temperature water vapor is being produced by combustion of a hydrogen-containing fuel. The resultant reaction produces fine aerosol of solid oxide in gaseous byproducts from which the oxide can be recovered in aerogel form made up of very small discrete particles. Since the gaseous byproducts can be separated from the solid oxide at temperatures above that at which any of the byproducts condenses, the resultant oxides are not hydrated and are very pure and substantially anhydrous. For example, silica produced in this manner is about 99% pure, while alumina of this type usually contains about 5% or less volatile matter. A particularly preferred oxide is a low density silica known in the art as flame-hydrolyzed silica, having a trade name Cab-O-Sil.

Obviously some consideration must be given to the particular solid used in a given electrolyte. The solid should be chemically stable in the presence of the electrolyte, but choosing suitable combinations of solid oxides and electrolytes is within the ordinary skill of the art or readily determined by routine test.

The following example is presented as an illustration of the invention, but is not to be construed as a limitation thereof:

EXAMPLE

Tests were conducted using a fuel cell having circular carbon disc electrodes impregnated with platinum and the cell body was three mated pieces of Lucite.

The carbon electrodes were two discs of carbon (Speers Carbon No. 872) 2½ inches in diameter and ⅛ inch thick. The electrodes were prepared by washing with water treating with aqua regia, washed again with water, followed by impregnation with a 3 weight percent aqueous solution of chloroplatinic acid, drying and heating in hydrogen at 750–800° F. to convert the platinum compound to platinum.

The electrodes and housing were assembled using O-rings on each side of the electrode and gold foil was used to connect the electrodes to the external electrical measuring circuit. The cell was clamped together and held by four bolts through the Lucite housing. The electrodes were spaced ⅝ inch apart and had an effective diameter of two inches. The end members provided a space for holding fuel and oxidant in contact with the electrode surfaces, and conduits were provided in each end member for proper introduction of these reactants from external sources. The electrolyte was contained between the two electrodes in a cylindrical space by the Lucite body of the cell and the electrodes.

In one test, the electrolyte used was 30 weight percent aqueous sulfuric acid containing 3 weight percent of a low density, flame-hydrolyzed silica (Cab-O-Sil) added. This silica had about 97.5 percent void space in a settled bed. The electrolyte was not mobile in the cell under the force of gravity, but could be moved quite easily by a spatula or spoon.

The cell was tested with hydrogen as the fuel and oxygen as the oxidizer. The open circuit voltage was 0.73 volt, this being the same as the cell without the gelling agent.

Under load, the cell operated with stable current output, with load-voltage relations as follows:

| Load, ma./cm.$^2$ | Voltage |
|---|---|
| 2.5 | 0.23 |
| 1.0 | 0.52 |

Using 30 percent aqueous sulfuric acid in a similar cell, no sustained power output was possible because of electrode flooding.

While the invention has been illustrated with one fuel cell, it is obvious that the water vapor from a plurality of fuel cells can be collected and passed to one or more condensers and the condensed water passed to one or more reservoirs and then through one or more flow control valves back to the fuel cells.

As noted above, the drawing is merely diagrammatic and is not intended to fully show all component parts of the equipment which one skilled in the art will routinely design for the operation. Indeed, the showing of an element or piece of equipment does not mean that all such or similar pieces of equipment which may or can be designed by one skilled in the art in possession of this disclosure cannot be utilized as substitution therefor; likewise, the omission of an element which one skilled in the art may include in an actual unit does not mean that such a piece of equipment is intended to be omitted simply because it does not appear in the drawing. The fuel cell can be operated at atmospheric pressure, subatmospheric pressure or superatmospheric pressure as desired. The fuel cell can be operated at any suitable temperature, taking into consideration the pressure, the nature of the electrolyte, and the like, and preferably in the range of about 30 to about 250° F. Suffice to say, the drawing is for illustrative purposes, as is the description thereof.

Reasonable variation and modification are possible within the scope of the foregoing disclosure, the drawing and the appended claim to the invention.

I claim:

A fuel cell comprising a body portion, first and second end pieces, first and second carbon electrodes impregnated with platinum, means for mounting said fuel electrode between said body portion and said first end piece, means for mounting said second electrode between said body portion and said second end piece, means for connecting a first output terminal to said first electrode, means for connecting a second output terminal to said second electrode, means for introducing a fuel through said first end piece to said first electrode, means for introducing an oxidant gas through said second end piece to said second electrode, a gelled electrolyte positioned within said body portion in contact with said first and second electrodes as the sole material between said first and second electrodes, said gelled electrolyte comprising aqueous sulfuric acid and a finely divided silica having a void space in a settled bed in the range of about 75 to about 99.5 volume percent, the amount of said silica being in the range of 1 to 10 weight percent of said sulfuric acid, conduit means in fluid communication with the upper portion of the region between said first and second electrodes containing said gelled electrolyte for the removal of steam therefrom, a reservoir, means for condensing the thus withdrawn steam and passing the condensate into said reservoir, an overflow conduit in fluid communication with said reservoir at the level at which it is desired to maintain the electrolyte in said region, said overflow conduit serving to withdraw excess water from said reservoir to maintain said level constant, conduit means in fluid communication between a lower portion of said reservoir below said level and a lower portion of said region for the passage of water from said reservoir to said region, and check valve means operatively positioned in the last-mentioned conduit means to permit passage of water therethrough only in the direction from said reservoir to said region.

References Cited by the Examiner

UNITED STATES PATENTS

| | | | |
|---|---|---|---|
| 2,384,463 | 9/1945 | Gunn et al. | 136—86 |
| 2,629,758 | 2/1953 | Ruben | 136—158 |
| 3,002,039 | 9/1961 | Bacon | 136—86 |
| 3,116,170 | 12/1963 | Williams et al. | 136—86 |
| 3,152,014 | 10/1964 | Berger et al. | 136—86 |

FOREIGN PATENTS

| | | |
|---|---|---|
| 571,305 | 8/1945 | Great Britain. |
| 769,850 | 3/1957 | Great Britain. |
| 844,584 | 8/1960 | Great Britain. |

ALLEN B. CURTIS, *Primary Examiner.*

JOHN R. SPECK, JOHN H. MACK, WINSTON A. DOUGLAS, *Examiners.*

H. FEELEY, *Assistant Examiner.*